United States Patent [19]

Homma et al.

[11] Patent Number: 4,981,728

[45] Date of Patent: Jan. 1, 1991

[54] ADHESION METHOD

[75] Inventors: Michihide Homma; Atsuko Yoshihara; Hiroshi Wakabayashi; Katsuhiko Isayama, all of Hyogo, Japan

[73] Assignee: Kanegafuchi Chemical Industry Co., Ltd., Osaka, Japan

[21] Appl. No.: 472,376

[22] Filed: Feb. 1, 1990

[30] Foreign Application Priority Data

Feb. 1, 1989 [JP] Japan ................................ 1-24662

[51] Int. Cl.$^5$ ............................................. B05D 3/02
[52] U.S. Cl. .................................... 427/386; 427/387; 427/407.1; 525/100; 525/105; 525/407; 525/438; 525/446; 525/476; 528/27
[58] Field of Search ..................... 427/386, 387, 407.1; 525/100, 105, 407, 438, 446, 476; 528/27

[56] References Cited

U.S. PATENT DOCUMENTS 4,334,036  6/1982  Yonezawa et al. ................. 525/102
4,657,986  4/1987  Isayama et al. ..................... 525/407

Primary Examiner—Michael Lusignan
Attorney, Agent, or Firm—Wegner, Cantor, Mueller & Player

[57] ABSTRACT

A cured material of a curable composition comprising (1) an organic elastomeric polymer having at least one silicon-containing group to the silicon atom of which a hydroxyl group and/or a hydrolyzable group are bonded and which is cross linkable through formation of a siloxane linkage in a molecule, (2) an epoxy resin, (3) a curing agent for the epoxy resin and (4) a curing catalyst for the organic elastomeric polymer is firmly adhered to a substrate when a vinyl type polymer having at least one silicon-containing group to the silicon atom of which a hydroxyl group and/or a hydrolyzable group are bonded and which is cross linkable through formation of a siloxane linkage is coated on a substrate before application of the curable composition.

13 Claims, No Drawings

ADHESION METHOD

BACKGROUND OF THE INVENTION

1. Field of the Invention

The present invention relates to an adhesion method, and more particularly, it relates to a method for adhering an organic elastomeric polymer composition on a substrate with using a specific primer.

2. Description of the Related Art

U.S. Pat. No. 4,657,986 discloses a curable composition comprising an organic elastomeric polymer having at least one silicon-containing group, to the silicon atom of which a hydroxyl group and/or a hydrolyzable group are bonded, and which is cross linkable through formation of a siloxane linkage (hereinafter referred to as "silicon-containing reactive group") in a molecule and an epoxy resin. Although this composition has good adhesion to a substrate on which the composition is applied, it is desired to improve the adhesion property of this composition, particularly when the composition is applied on a concrete or mortar.

SUMMARY OF THE INVENTION

A main object of the present invention is to provide a novel method for adhering to a substrate a composition comprising an organic elastomeric polymer having at least one silicon-containing reactive group.

Accordingly, the present invention provides a method for adhering a curable composition comprising (1) an organic elastomeric polymer having at least one silicon-containing reactive group in a molecule, (2) an epoxy resin, (3) a curing agent for said epoxy resin and (4) a curing catalyst for said organic elastomeric polymer, which method comprises applying a primer comprising a vinyl type polymer having at least one silicon-containing reactive group on a substrate, applying said curable composition on the primer and curing said composition.

DETAILED DESCRIPTION OF THE INVENTION

The curable composition to be used in the present invention comprises (1) an organic elastomeric polymer having at least one silicon-containing reactive group in a molecule, (2) an epoxy resin, (3) a curing agent for the epoxy resin and (4) a curing catalyst for the organic elastomeric polymer.

Specific examples of a backbone of the organic elastomeric polymer having at least one silicon-containing reactive group in a molecule are polyethers prepared by ring opening polymerization of cyclic ethers (e.g. propylene oxide, ethylene oxide, tetrahydrofuran and the like); polyesters prepared by polycondensation of a dibasic acid (e.g. adipic acid) and glycol or ring opening polymerization of lactones; ethylene/propylene copolymers; polyisobutylene and copolymers of isobutylene with isoprene and the like; polychloroprene; polyisoprene and copolymers of isoprene with butadiene, styrene, acrylonitrile and the like; polybutadiene and copolymers of butadiene with styrene, acrylonitrile and the like; polyolefins prepared by hydrogenating polyisoprene, polybutadiene or isoprene/butadiene copolymers; polyacrylates prepared by radical polymerization of acrylate (e.g. ethyl acrylate, butyl acrylate and the like) and copolymers of acrylate with vinyl acetate, acrylonitrile, styrene, ethylene and the like; graft polymers prepared by polymerizing a vinyl monomer in the organic elastomeric polymer which is used in the present invention; polysulfides; and the like Among them, preferable are polyethers comprising repeating units of the formula: —R—O— wherein R is a $C_2$-$C_4$ alkylene group (e.g. polypropylene oxide and the like); graft polymers prepared by polymerizing a vinyl monomer (e.g. acrylate, styrene, acrylonitrile, vinyl acetate and the like) in the presence of polyether (e.g. polypropylene oxide and the like); polyalkyl acrylate or copolymers of at least 50% by weight of alkyl acrylate with vinyl acetate, acrylonitrile, styrene, ethylene and the like, since they can easily introduce the silicon-containing reactive group at a chain end of the molecule and are suitable for the preparation of a liquid polymer in the absence of a solvent.

Typically, the silicon-containing reactive group is represented by the formula:

wherein X is a hydroxyl group or a hydrolyzable group, $R^1$ and $R^2$ are the same or different and each a monovalent hydrocarbon group having 1 to 20 carbon atoms or a triorganosiloxy group of the formula: $R_3^3$—Si—O— in which $R^3$ are the same or different and each a monovalent hydrocarbon group having 1 to 20 carbon atoms, "a" is 0, 1, 2 or 3, "b" is 0, 1 or 2 provided that the total of "a" and "b" is at least 1, preferably from 1 to 5, and "m" is 0 or an integer of 1 to 18. When two or more $R^1$ or $R^2$ groups are present, they may be the same or different, and when two or more X groups are present, they may be the same or different. In addition, the groups in the brackets are not necessarily the same with one another, when "m" is not zero.

When X is the hydrolyzable group, the group (I) is cross linked through hydrolysis with water and a silanol condensation reaction in the presence or absence of a catalyst for the silanol condensation. When X is the hydroxyl group, the group (I) is cross linked through the silanol condensation reaction in the presence or absence of a catalyst for silanol condensation.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, a hydrogen atom, an alkoxy group, an acyloxy group, a ketoximate group, an amino group, an amide group, an aminoxy group, a mercapto group and an alkenyloxy group are preferable. Further, the alkoxy group is more preferable since it is mildly hydrolyzed and easily handled.

The silicon-containing reactive group has at least one silicon atom. When the silicon atoms are bonded through siloxane linkages, the silicon-containing reactive group has preferably not more than 20 silicon atoms.

Among the silicon-containing reactive group (I), a group of the formula:

wherein $R^1$, X and "a" are the same as defined above, is preferable from the viewpoint of easy availability.

Examples of the hydrocarbon group for $R^1$ and $R^2$ are alkyl groups having 1 to 20 carbon atoms (e.g. a methyl group or an ethyl group), cyclyalkyl groups having at least three carbon atoms (e.g. a cyclohexyl group), aryl groups having 6 to 20 carbon atoms (e.g. a phenyl group) and aralkyl groups having 7 to 20 carbon atoms (e.g. a benzyl group). Among them, a methyl group is preferable.

Examples of the triorganosiloxy group are groups of the formula: $R_3^3$—Si—O— in which $R^3$ is a methyl group or a phenyl group.

The silicon-containing reactive group (II) chemically bonds to the backbone chain of the organic elastomeric polymer. It is not preferable for the silicon-containing reactive group to be bonded to the backbone chain through an a bond structure of the formula: ≡Si—O—C≡, since such structure tends to be cleavaged with water. A preferable bonding structure between the silicon atom of the reactive group and the backbone chain is, for example, a structure of the formula: ≡Si—C—C≡.

The organic elastomeric polymer has at least one, preferably 1.2 to 6 silicon-containing reactive groups in a molecule on the average. When the number of the silicon-containing containing group in a molecule is less than one on the average, the composition of the invention is not effectively cured and the rubbery elasticity is not satisfactorily achieved. Preferably, the silicon-containing reactive group is attached to the chain end of the organic polymer molecule, because the terminal silicon-containing reactive group elongates the chain length between the adjacent cross linking sites in the cured product so that the rubbery elasticity is easily achieved so that brittleness of the epoxy resin is more effectively improved, and the elastomeric cured product has better strength.

The molecular weight of the organic polymer having the silicon-containing reactive group is usually from 500 to 50,000, preferably from 1,000 to 20,000.

The silicon-containing reactive group having a silicon atom to which a hydroxyl group is attached may be prepared by hydrolyzing the silicon-containing reactive group having a silicon atom to which a hydrolyzable group is attached.

The silicon-containing reactive group may be introduced in the organic elastomeric polymer by the following procedures:

(1) Copolymerizing a monomer having a copolymerizable unsaturated bond and the silicon-containing reactive group (e.g. vinyltrialkoxysilane, methacryloyloxypropylmethyldialkoxysilane, methacryloyloxypropyltrialkoxysilane and the like) with a polymerizable monomer (e.g. ethylene, propylene, isobutylene, chloroprene, isoprene, butadiene, acrylate and the like); or copolymerizing a monomer having a copolymerizable epoxy group and the silicon-containing reactive group (e.g. γ-glycidoxypropyltrimethoxysilane, γ-glycidoxypropylmethyldimethoxysilane and the like) with propylene oxide or ethylene oxide. By this manner, the silicon-containing reactive group is introduced in the side chain of the organic polymer.

(2) Polymerizing a radically polymerizable monomer in the presence of a mercapto or disulfide type chain transfer agent having the silicon-containing reactive group (e.g. mercaptopropyltrialkoxysilane, mercaptopropylmethyldialkoxysilane and the like).

(3) Polymerizing a radically polymerizable monomer by the use of an azo or peroxide type polymerization initiator having the silicon-containing reactive group (e.g. azobis-2-(6-methyldiethoxysilyl-2-cyanoexane) and the like).

By the procedures (2) and (3), the silicon-containing reactive group is introduced at the chain end of the polymer molecule.

(4) Reacting a compound having a functional group Y' and the silicon-containing reactive group with a polymer having a functional group Y reactive with the functional group Y' (e.g. a hydroxyl group, a carboxyl group, a mercapto group, an epoxy group, an isocyanate group and the like) on the side chain and/or at the chain end of the molecule.

The procedures (1), (2) and (3) are described in U.S. Pat. No. 4,657,986, the disclosure of which is hereby incorporated by reference.

Preferable examples of the organic polymer having the silicon-containing reactive group are disclosed in U.S. Pat. Nos. 3,408,321, 3,453,230 and 3,592,795 the disclosures of which are hereby incorporated by reference, Japanese Pat. Publication Nos. 36,319/1970, 12,154/1971 and 32,673/1974, and Japanese Pat. Kokai Publication (unexamined) Nos. 156,599/1975, 73,561/1976, 6096/1979, 13,767/1980, 13,768/1979, 82,123/1980, 123,620/1980, 125,121/1980, 131,021/1980, 131,022/1980, 135,135/1980, 137,129/1980, 179,210/1982, 191,703/1983, 78,220/1984, 78,221/1984, 78,222/1984, 78,223/1984, 168,014/1984 and 268,720/1986.

The epoxy resin may be any one of conventionally used ones. Specific examples of the epoxy resin are epichlorohydrin-bisphenol A type epoxy resin, flame-retardant epoxy resins (e.g. epichlorohydrin-bisphenol F type epoxy resin, glycidyl ether of tetrabromobisphenol A and the like), novolak type epoxy resins, hydrogenated bisphenol A type epoxy resins, epoxy resins of the type of glycidyl ether of bisphenol A-propyleneoxide adduct, glycidyl p-oxybenzoate type epoxy resin, m-aminophenol type epoxy resins, diaminodiphenylmethane type epoxy resins, urethane modified epoxy resins, alicyclic epoxy resins, glycidyl ether of polyhydric alcohol (e.g. N,N-diglycidylaniline, N,N-diglycidyl-o-toluidine, triglycidylisocyanurate, polyalkyleneglycol diglycidyl ether, glycerin and the like), hydantoin type epoxy resins, epoxidized unsaturated polymer such as petroleum resin, and the like. Among them, those having at least two epoxy groups of the formula:

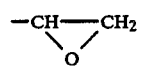

in a molecule are preferable since they are highly reactive during curing and the cured product easily forms a three dimensional network. Most preferable are the bisphenol A type epoxy resins and the novolak type epoxy resins.

The curing agent for the epoxy resin used according to the present invention may be any one of the conventionally used ones. Specific examples of the curing agent are amines (e.g. triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, 2,4,6-tris-(dimethylaminomethyl)phenol and the like); tert-amine salts; polyamide resins; imidazoles; dicyanodiamides; complex compounds of boron trifluoride, carboxylic acid anhydrides (e.g. phthalic anhydride, hexahydrophthalic anhydride, tetrahydrophthalic anhydride, endomethylenetetrahydrophthalic anhydride, dodecinyl succinic anhydride, pyromellitic anhydride, chlorendic anhydride and the like); alcohols; phenols; carboxylic acids; and ketimine. They may be used independently or as a mixture.

As the curing catalyst for the organic elastomeric polymer having at least one silicon-containing reactive group, any of conventionally used silanol condensation catalysts can be used. Specific examples of the silanol condensation catalyst are titanates (e.g. tetrabutyl titanate and tetrapropyl titanate), tin carbonates (e.g. dibutyltin dilaurate, dibutyltin maleate, dibutyltin diacetate, tin octylate and tin naphthenate), a reaction product of dibutyltin oxide and a phthalate, dibutyltin diacetylacetonate, organic aluminum compounds (e.g. aluminum trisacetylacetonate, aluminum trisethylacetoacetate and diisopropoxyaluminum ethylacetoacetate), chelate compounds (e.g. zirconium tetraacetylacetonate and titanium tetraacetylacetonate), lead octylate, amines (e.g. butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU)) or their salts with carboxylic acids, low molecular weight polyamide resins prepared from excessive polyamine and a polybasic acid, reaction products of excessive polyamine and an epoxy compound, silane coupling agents having an amino group (e.g. ■-aminopropyltrimethoxysilane and N-(β-aminoethyl)aminopropylmethyldimethoxysilane), and other silanol condensation acid or base catalysts. The catalysts may be used independently or as a mixture.

The amounts of each components (1), (2), (3) and (4) in the curable composition are not critical in the present invention. Preferably, the composition comprises 10 to 95% by weight, preferably 30 to 90% by weight of the organic elastomeric polymer (1), 5 to 90% by weight, preferably 10 to 70% by weight of the epoxy resin (2). curing agent (3) for the epoxy resin is contained in an amount of 0.1 to 300 parts by weight, preferably 1 to 200 parts by weight per 100 parts of the epoxy resin (2). The curing catalyst (4) for the organic elastomeric polymer is contained in an amount of 0.1 to 15 parts by weight, preferably 0.3 to 10 parts by weight per 100 parts by weight of the organic elastomeric polymer (1).

The curable composition to be used in the present invention may contain other conventionally used components such as fillers (e.g. calcium carbonate, talc, titanium oxide, etc.), silicon-containing compounds, plasticizers, anti-aging agents, UV light absorbing agents, lubricants, pigments, foaming agents, and the like. Among these additional components, the silicon-containing compound having a silicon-containing reactive group and a functional group reactive with the epoxy group is preferred since it improves the strength of the cured material and adhesivity of the cured material to the substrate.

Examples of the functional group reactive with the epoxy group are a primary, secondary or tertiary amino group, a mercapto group, an epoxy group and a carboxyl group. The silicon-containing reactive group may be the same as that of the organic elastomeric polymer. The alkoxysilyl group is particularly preferable due to its good handling properties.

Specific examples of the silicon-containing compound are amino group-containing silanes (e.g. γ-aminopropyltrimethoxysilane, γ-aminopropyltriethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-ureidopropyltriethoxysilane, N-β-(N-vinylbenzylaminoethyl)-γ-aminopropyltrimethoxysilane, γ-anilinopropyltrimethoxysilane and the like); mercapto group-containing propyltriethoxysilane, γ-mercaptopropylmethyldimethoxysilane, γ-mercaptopropylmethyldiethoxysilane and the like); epoxy group-containing silanes (e.g. γ-glycidoxypropyltrimethoxysilane, γ-glycidoxypropylmethyldimethoxysilane, γ-glycidoxypropyltriethoxysilane, β-(3,4-epoxycyclohexyl)-ethyltrimethoxysilane and the like); carboxysilanes (e.g. β-carboxyethyltriethoxysilane, β-carboxyethylphenylbis(2-methoxyethoxy)silane, N-β-(N-carboxymethylaminoethyl)-γ-aminopropyltrimethoxysilane and the like). The silicon-containing compound may be used alone or as a mixture with at least one other silicon-containing compound.

The amount of the silicon-containing compound is so selected that a weight ratio of the total weight of the organic elastomeric polymer and the epoxy resin to the weight of the silicone compound is from 100:0.1 to 100:20, preferably from 100:0.2 to 100:10.

The substrate on which the curable composition is applied may be any of conventionally used materials. Examples of the substrate material are metals (e.g. iron, copper, aluminum, etc.), synthetic resins (e.g. polyolefins such as polyethylene and polypropylene, polyvinyl chloride, ABS resins, fluororesins, silicone resins, phenol resins, polystyrene, methacrylic resins, polycarbonate, polyacetal, -nylon, polyether ether ketone, polyether sulfone, polysulfone, polyamideimide, polyethylene phthalate, polybutylene phthalate, polyphenylene sulfide, modified polyphenyleneoxide, etc.), rubbers (e.g. natural rubbers, butadiene rubbers, styrene-butadiene rubbers, butyl rubbers, NBR, silicone rubbers, EPDM, acrylic rubbers, fluororubbers, etc.), wood, glass, ceramics, hard boards, slate plates, calcium silicate plates, mortar, concrete, stones and the like. Among them, porous ones such as wood, glass, ceramics, stones, hard boards, slate plates, calcium silicate plates, mortar and concrete are preferably coated with the composition of the present invention.

According to the present invention, the substrate is coated with the vinyl type polymer having at least one silicon-containing reactive group as the primer before the application of the organic elastomeric polymer composition.

The silicon containing reactive group in the vinyl type polymer can be the same as that described in connection with the organic elastomeric polymer (1). Preferably, the vinyl type polymer has at least one silicon-containing reactive group, preferably 1 to 20 silicon-containing reactive groups in a molecule. When the number of the silicon-containing reactive group is less than one, water resistance of the coated film of the organic elastomeric polymer composition tends to decrease. The silicon-containing reactive group may be present at a chain end, an internal chain part or both. Preferably, the silicon-containing reactive group is present at the chain end, since such silicon-containing reactive group can impart flexibility to the coated film and has good balance of properties. The silicon-containing reactive group can be introduced in the vinyl type polymer in the same manner as in case of the organic elastomeric polymer.

The vinyl type polymer having at least one silicon-containing reactive group can be prepared in a known manner. For example, at least one vinyl compound of the formula:

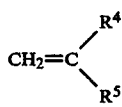 (III)

wherein $R^4$ is a hydrogen atom, a halogen atom (e.g. a chlorine atom, a fluorine atom, a bromine atom or an iodine atom), a substituted or unsubstituted aliphatic hydrocarbon group having 1 to 10 carbon atoms, $R^5$ is the same as $R^4$ or a monovalent organic group selected from the group consisting of a substituted or unsubstituted monovalent aromatic hydrocarbon group, an alkenyl group, a carboxyl group, an acyloxy group, an alkoxycarbonyl group, a nitrile group, a pyridyl group, an amide group and a glycidoxy group is reacted with at least one vinyl type silicon-containing compound of the formula:

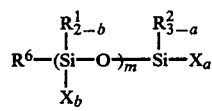 (IV)

wherein $R^1$, $R^2$, X, a, b and m are the same as defined above, and $R^6$ is an organic group having a polymerizable double bond.

Specific examples of the vinyl compound (III) are acrylates or methacrylates (e.g. methyl acrylate and methacrylate, ethyl acrylate and methacrylate, butyl acrylate and methacrylate, isobutyl acrylate and methacrylate, 2-ethylhexyl acrylate and methacrylate, benzyl acrylate and methacrylate, lauryl acrylate and methacrylate, steary acrylate and methacrylate, etc.), carboxylic acids or their anhydrides (e.g. acrylic acid, methacrylic acid, itaconic acid, fumaric acid, maleic anhydride, etc.), epoxy group-containing monomers (e.g. glycidyl acrylate and methacrylate, etc.), amino compounds (e.g. diethylaminoethyl acrylate and methacrylate, aminoethyl vinyl ether, etc.), amide compounds (e.g. acrylamide, methacrylamide, itaconic acid diamide, a-ethylacrylamide, crotonamide, fumaric acid diamide maleic acid diamide, Nobutoxymethylacrylamide, N-butoxymethylmethacrylamide, etc.), hydroxyl group-containing vinyl compounds (e.g. 2-hydroxyethyl acrylate and methacrylate, 2-hydroxypropyl acrylate and methacrylate, 2-hydroxyvinyl ether, N-methylolacrylamide, Aronics 5700 (a trade name of Toa Gosei Co., Ltd.), etc.), acrylonitrile, iminol methacrylate, styrene, α-methylstyrene, chlorostyrene, vinyl chloride, vinylidene chloride, vinyl acetate, vinyl propionate, vinylpyridine, butadiene, chloroprene, isobutylene, propylene, ethylene, and the like. Among them, the acrylates and methacrylates such as methyl methacrylate, ethyl acrylate, isobutyl acrylate, 2-ethylhexyl acrylate, lauryl acrylate and stearyl acrylate the epoxy group-containing monomers and acrylamide are preferable, and the acrylates and methacrylates are more preferable.

Specific examples of the vinyl type silicon-containing compound (IV) are $CH_2=CHSi(CH_3)(OCH_3)_2$, $CH_2=CHSi-(CH_3)(OCH_2CH_3)_2$, $CH_2=CHSi(CH_3)Cl_2$, $CH_2=CHSi(OCh_3)_3$, $CH_2=CH-Si(OCH_2CH_3)_3$, $CH_2=CHSiCl_3$, $CH_2=CHCOO(CH_2)_2Si(CH_3)(OCH_3)_2$, $CH_2=CHCOO(CH_2)_2Si(CH_3)(OCH_2CH_3)_2$, $CH_2=CHCOO(CH_2)_2Si(CH_3)Cl_2$, $CH_2=CHCOO(CH_2)_3Si(OCH_3)_3$, $CH_2=CHCOO(CH_2)_3Si(OCH_2CH_3)_3$, $CH_2=CHCOO(CH_2)_3SiCl_3$, $CH_2=C(CH_3)-COO(CH_2)_3Si(CH_3)(OCH_3)_2$, $CH_2+C(CH_3)-COO(CH_2)_3Si(CH_3)(OCH_2CH_3)_2$, $CH_2+C(CH_3)-COO(CH_2)_3-Si(CH_3)Cl_2$, $CH_2+C(CH_3)-COO(CH_2)_3Si(OCH_3)_3$, $CH_2+C(CH_3)-COO-(CH_2)_3Si(CH_2CH_3)_3$, $CH_2+C(CH_3)-COO(CH_2)_3SiCl_3$, $CH_2+CHCH_2-$

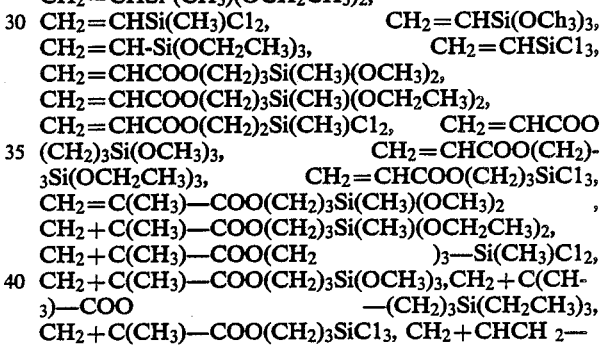

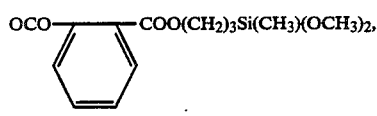

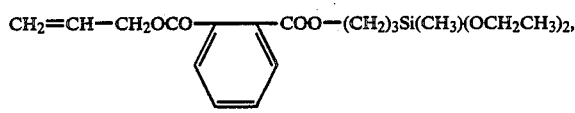

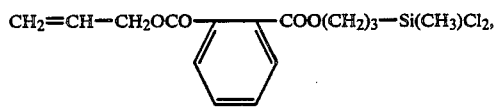

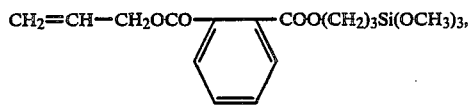

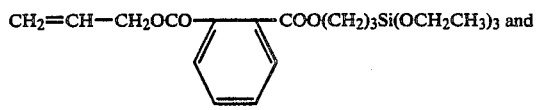

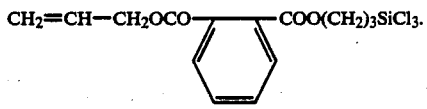

Among them, $CH_2=C(CH_3)-COO(CH_2)_3Si(OCH_3)_3$ is preferred.

The vinyl type silicon-containing compound (IV) is used in an amount of 0.001 to 50% by weight, preferably 0.01 to 10% by weight, more preferably 0.1 to 5% by weight based on the weight of the vinyl monomer (III).

The vinyl monomer (III) and the vinyl type silicon-containing compound (IV) are copolymerized by a per se conventional method. The copolymerization is initiated with a radical polymerization initiator or by irradiation of UV light, X-ray or γ-ray.

Examples of the radical polymerization initiator are peroxides (e.g. benzoyl peroxide, benzoyl hydroperoxide, di-tert.-butyl peroxide, di-tert.-butyl hydroperoxide, acetyl peroxide, lauroyl peroxide, hydrogen peroxide, etc.), azo compounds (e.g. azobisisobutyronitrile, etc.), and peroxy compounds (e.g. persulfates, diisopropyl peroxydicarbonate, etc.). The copolymerization can be carried out in the presence or absence of a solvent. When the solvent is used, one that is inactive both to the vinyl monomer (III) and the vinyl type silicon-containing compound (IV) is preferably used. Examples of such solvent are ethers, hydrocarbons and acetates. The polymerization temperature depends on the polymerization manners and/or the kinds of the polymerization initiators, and preferably is from 50 to 150° C. The polymerization degree can be controlled with a conventionally used chain transfer agent such as mercaptans (e.g. n-dodecylmercaptan, tert.-dodecylmercaptan, mercaptan having the silicon-containing reactive group (namely, mercaptosilane), etc.) and halogen-containing compounds.

Although the vinyl monomer (III) and the vinyl type silicon-containing compound (IV) can be added to a polymerization system in one portion, they may be added by portions or continuously so as to control the reaction heat.

When the polymerization initiator and/or the chain transfer agent have the silicon-containing reactive group, the vinyl type polymer having the silicon-containing reactive group can be prepared in the absence of the vinyl type silicon-containing compound (IV).

Alternatively, the vinyl type polymer having the silicon-containing reactive group can be prepared without using the vinyl tape silicon-containing compound (IV) by polymerizing the vinyl monomer to give a polymer having ethylenically unsaturated groups in side chains or at chain ends, and reacting such ethylenically unsaturated groups with a hydrogenated silicon-containing compound.

The vinyl type polymer having the silicon-containing reactive group preferably has a number average molecular weight of 500 to 50,000, more preferably 1000 to 30,000. The vinyl type polymer can be used alone or a mixture of two or more vinyl type polymer may be used.

Such vinyl type polymer having the silicon-containing reactive group is described in Japanese Pat. Kokai Publication Nos. 36,595/1979, 123,192/1979, 179,210/1982, 168,014/1984, 31,556/1985 and 112,642/1988.

As described above the acrylic polymer is preferred as the backbone of the vinyl type polymer having the silicon-containing reactive group. In particular, when a copolymer of an acrylic monomer having a long-chain alkyl group and an acrylic monomer having a short-chain alkyl group is used as the primer in the present invention, water resistant adhesion on the slate plate and mortar can be greatly improved.

The copolymer of the acrylic monomer having a long-chain alkyl group and the acrylic monomer having a short-chain alkyl group (hereinafter referred to as "long-chain alkyl group containing copolymer") will be explained.

The long-chain alkyl group containing copolymer comprises acrylic monomeric units having a short-chain alkyl group of the formula:

wherein $R^7$ is an alkyl group having 1 to 8 carbon atoms, and $R^8$ is a hydrogen atom or a methyl group and acrylic monomeric units having a long-chain alkyl group of the formula:

wherein $R^8$ is the same as defined above, and $R^9$ is an alkyl group having at least 10 carbon atoms.

In the formula (V), $R^7$ is a short-chain alkyl group having 1 to 8 carbon atoms, preferably 1 to 4 carbon atoms, more preferably 1 or 2 carbon atoms such as a methyl group, an ethyl group, a propyl group, an n-butyl group, a tert.-butyl group and a 2-ethylhexyl group. Two or more kinds of the alkyl groups $R^7$ may be present in one molecule.

In the formula (VI), $R^9$ is a long chain alkyl group having at least 10 carbon atoms, usually 10 to 30 carbon atoms, preferably 10 to 20 carbon atoms such as a lauryl group, a tridecyl group, a cetyl group, a stearyl group, a decosanyl group and a behenyl group. Two or more kinds of the alkyl groups $R^9$ may be present in one molecule.

The primer comprising the vinyl type polymer having at least one silicon-containing reactive group may contain a solvent. The solvent increases processability of the primer. When the primer is applied on a wet surface, a polar solvent such as alcohols (e.g. isopropanol) or ketones (e.g. methyl ethyl ketone) improves the adhesion property of the primer.

In the method of the present invention, the primer is first applied on the surface of substrate to form a primer layer. Then, the curable composition is applied on the primer layer and cured. The primer and the curable composition may be applied by a per se conventional way such as brush coating, roll coating, spray coating and the like.

An applied amount of the primer is 20 to 400 g, preferably 40 to 100 g of the vinyl type polymer per square meter of the substrate surface. After the application of the primer, the coated substrate may be heated at a temperature from 50° to 120° C. for 1 to 60 minutes or kept at room temperature for a long time.

PREFERRED EMBODIMENTS OF THE PRESENT INVENTION

The present invention will be illustrated by following Examples, wherein "parts" are by weight unless otherwise indicated.

PREPARATION EXAMPLE 1

Polypropylene glycol having the number average molecular weight of 2500 (90 parts) and polypropylene triol having the number average molecular weight of 300 (10 parts) were chain extended with methylene chloride according to the method described in U.S. Pat. No. 4,657,986 and molecular ends were capped with allyl cholride to obtain polypropylene oxide 99% of the terminal groups of which were capped with allyl ether groups and which had the number average molecular weight of 8000.

The resulting polypropylene oxide (800 g) and then methyldimethoxysilane (20 g) were charged in an autoclave equipped with a stirrer. After the addition of a solution of chloroplatinic acid (8.9 g of $H_2PtCl_6.6H_2O$ in 18 ml of isopropanol and 160 ml of tetrahydrofurane) (0.40 ml), the reaction was contained at 80° C. for 6 hours while stirring.

An amount of the unreacted hydrosilyl groups in the reaction mixture was monitored by IR spectrum analysis to find that substantially no such group remained. According to determination of the silicon-containing group by NMR, it was confirmed that polypropylene oxide had, at the chain ends, about 1.75 groups of the formula:

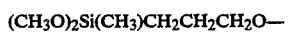

(CH$_3$O)$_2$Si(CH$_3$)CH$_2$CH$_2$CH$_2$O— in a molecule on the average.

PREPARATION EXAMPLE 2

Polypropylene glycol having the number average molecular weight of 2000 was chain extended with methylene chloride and capped with allyl chloride to obtain polypropylene oxide 95% of the terminal groups of which were capped with allyl ether groups and which had the number average molecular weight of 5000.

The resulting polypropylene oxide (500 g) and then triethoxysilane (32 g) were charged in the autoclave equipped with stirrer. After the addition of the solution of chloroplatinic acid having the same composition as in Preparation Example 1 (0.40 ml), the reacton was continued at 90° C. for 3 hours.

After removing the excessive triethoxysilane under reduced pressure, an amount of the silicon-containing groups was measured by NMR to confirm that polypropylene oxide had, at the chain end, about 1.8 groups of the formula:

(CH$_3$CH$_2$O)$_3$SiCH$_2$CH$_2$CH$_2$O— in a molecule on the average.

PREPARATION EXAMPLE 3

Polypropylene glycol having the number average molecular weight of 3000 (300 g) was charged in a flask equipped with a stirrer. Then, tolylenediisocyanate (26 g) and dibutyltin dilaurate (0.2 g) were added and reacted in a nitrogen stream at 100° C. for 5 hours while stirring. Thereafter, γ-aminopropyltriethoxysilane (22.1 g) was added and reacted at 100° C. for 3 hours to obtain a polyether having an average molecular weight of about 6600 and containing terminal triethoxysilane groups and about two silicon-containing reactive groups in a molecule.

PREPARATION EXAMPLE 4

Butyl acrylate (80 g), stearyl methacrylate (20 g), Y-methacryloyloxypropylmethyldimethoxysilane (2.2 g), γ-mercaptopropylmethyldimethoxysilane (1.8 g) and 2,2'-azobisisobutyronitrile (0.5 g) were homogeneously mixed. Then, the mixture (25 g) was charged in a four-necked 200 ml flask equipped with a stirrer and a condenser and heated to 80° C. on an oil bath while introducing nitrogen gas. Within several minutes, the polymerization was initiated with generating heat. After the heat generation calmed, the rest of the mixture was dropwise added over 3 hours to proceed polymerization. After 15 minutes and 30 minutes from the completion of addition of the mixture, azobisisobutyronitrile (each 0.15 g) was added. After the addition of the latter portion of azobisisobutyronitrile, stirring was continued for 30 minutes to complete the polymerization.

The resulting liquid polymer was analyzed by gas permeation chromatograph (GPC) to find that the polymer had the number average molecular weight of about 10,000.

PREPARATION EXAMPLES 5–8

In a four-necked flask equipped with a stirrer and a condenser, xylene was charged and heated to 110° C. Then, a mixture of the monomers, the polymerization initiator and the chain transfer agent listed in Table 1 were dropwise added over 6 hours followed by post-polymerization for 2 hours. The molecular weight of the prepared copolymer is shown in Table 1. The reaction mixture was diluted with xylene to the solid content specified in Table 1.

TABLE 1

| Prep. Example No. | 5 | 6 | 7 | 8 |
|---|---|---|---|---|
| Butyl acrylate | 15 | 15 | — | 35 |
| Methyl methacrylate | 65 | 65 | 80 | 65 |
| Stearyl methacrylate | 20 | — | 20 | — |
| Lauryl methacrylate | — | 20 | — | — |
| TSMA*[1] | 6.9 | 4.8 | 1.2 | 6.9 |
| Mercaptosilane*[2] | — | — | 2 | — |
| AIBN | 0.5 | 1.7 | 5 | 0.5 |
| Xylene | 42 | 42 | 42 | 42 |
| Number average molecular weight*[3] | 18000 | 9800 | 4000 | 19200 |
| Solid content (%) | 40 | 50 | 60 | 40 |

Note:
*[1] γ-Methacryloyloxypropyltrimethoxysilane.
*[2] γ-Mercaptopropyltrimethoxysilane.
*[3] Measured by GPC.

EXAMPLE 1 AND COMPARATIVE EXAMPLE 1

The polymer prepared in Preparation Example 1 (100 parts), Epikote 828 (a bisphenol-A type epoxy resin manufactured by Yuka Shell Epoxy Co., Ltd.) (75 parts), 2,2'-methy-lene-bis(4-methyl-6-tert.-butyl-phenol) (NS-6) (1 p 2,4,6-tris(dimethylaminomethyl)-phenol (DMP-30) (7.5 parts), N-β-aminoethyl-γ-aminopropyltrimethoxysilane (1 part) and #918 (an organic tin compound manufactured by Sankyo Yuki Gosei Co., Ltd.) (1 part) were mixed to prepare a curable composition (hereinafter referred to as "Composition A").

Evaluation of adhesion properties

The polymer solution (primer) prepared in Preparation Example 5 was twice coated on a mortar plate (according to JIS A 5758, 50 mm ×50 mm ×10 mm) with absorbent cotton and dried at room temperature for 4 hours. A frame was formed with a masking tape and the composition A was poured in the frame to a thickness of about 4 mm and aged and cured at room temperature for a week to prepare a sample for evaluation of the adhesion properties.

1. The ordinary adhesion property is evaluated by peeling off the cured composition A with hands.

2. The water proof adhesion property is evaluated by immersing the sample in water kept at 50° C. for a week and peeling off the cured composition A with hands.

3. The wet surface adhesion property is evaluated as follows:

The mortar plate is immersed in water for one day and pulled out. The surface of the plate is wiped off with a moist gauze to remove water. Then, the polymer solution prepared in Preparation Example 5 is twice coated with absorbent cotton and the coated plate is aged at room temperature for a week. The composition A is coated on the surface in the same manner as above to prepare a sample for evaluation of the adhesion property. The wet surface adhesion property is evaluated by peeling of the cured composition A.

The results are shown in Table 2.

In Comparative Example 1, the same procedures as above were repeated without using the polymer solution prepared in Preparation Example 5 as the primer. The results are also shown in Table 2.

From the results, the use of the polymer solution prepared in Preparation Example 5 as the primer greatly improved the adhesion properties.

TABLE 2

| Example No | Primer | Adhesion properties*1 | | |
|---|---|---|---|---|
| | | Ordinary | Water proof | Wet surface |
| 1 | Prep. Ex. 5 | CF | CF | MF |
| Comp. 1 | None | Af | Easily AF | Easily AF |

Note:*1
CF: The cured material of the composition A was broken (cohesive failure).
MF: The cured material of the composition A was broken and also peeled off at the interface between the mortar plate and the cured material (mixed failure).
AF: The cured material of the composition A was peeled off at the interface between the mortar plate and the cured material (adhesion failure).

EXAMPLES 2 TO 5

In the same manner as in Example 1 but changing the composition of the primer as shown in Table 3, the adhesion properties were evaluated.

TABLE 3

| Example No | Primer composition | | Adhesion properties | |
|---|---|---|---|---|
| | Polymer (parts) | Additive(s) (parts) | Ordinary | Water proof |
| 2 | Prep Ex. 5 (100) | #918 (0.2) | CF | CF |
| 3 | Prep Ex. 5 (100) | #918 (0.2) A-187*1 (3) | CF | CF |
| 4 | Prep. Ex. 6 (100) | #918 (0.2) | CF | CF |
| 5 | Prep. Ex. 7 (100) | #918 (0.2) A-187 (5) | CF | CF |

Note:
*1γ-Glycidoxypropyltrimethoxysilane (manufactured by Nippon Unicar Co., Ltd.).

EXAMPLES 6 TO 11

In the same manner as in Example 1 but changing the composition of the composition A as shown in Table 4, the adhesion properties were evaluated.

The results are shown in Table 4.

TABLE 4

| Example No. | Composition of curable composition*1 | | | | Adhesion properties | |
|---|---|---|---|---|---|---|
| | Polymer (parts) | Epoxy resin*2 (parts) | DMP-30 (parts) | Additive(s) (parts) | Ordinary | Water proof |
| 6 | Prep. Ex. 1 (100) | 50 | 5 | A-1120*3 (1) | CF | CF |
| 7 | Prep. Ex. 1 (100) | 150 | 15 | KBM 602*4 (2) | CF | CF |
| 8 | Prep. Ex. 2 (100) | 50 | 5 | A-1120 (1) | CF | CF |
| 9 | Prep. Ex. 3 (100) | 100 | 10 | A-1120 (1) | CF | CF |
| 10 | Prep. Ex. 1 (100) | 50 | 5 | A-1120 (1) SB*5 (100) | CF | CF |
| 11 | Prep. Ex. 2 (100) | 75 | 7.5 | KBM 602 (1) Talc (70) | CF | CF |

Note:
*1All the composition contained NS-6 (1 part) and #918 (1 parts).
*2Epikote 828.
*3N-β-Aminoethyl-γ-aminopropyltrimethoxysilane.
*4N-β-Aminoethyl-γ-aminopropylmethyldimethoxysilane.
*5Heavy calcium carbonate (manufactured by Shiraishi Industries Co., Ltd.).

EXAMPLE 12

In the same manner as in Example 1 but using, in the composition A, a mixture of the polymer prepared in Preparation Example 4 (60 parts) and the polymer prepared in Preparation Example 1 (40 parts) in place of the polymer prepared in Preparation Example 1, a curable composition was prepared.

Then, in the same manner as in Example 1 but using the primer solution prepared in Preparation Example 8 in place of the solution prepared in Preparation Example 5, the adhesion properties were evaluated. Both the ordinary adhesion property and the water-proof adhesion property were rated "CF".

PREPARATION EXAMPLE 9

In the same manner as in Preparation Example 5 but using isopropanol in place of xylene to adjust the solid content of the polymer solution, a primer having the solid content of 40% was prepared.

EXAMPLE 13

In the same manner as in Example 1 but using the primer prepared in Preparation Example 9, the sample was prepared and the wet surface adhesion property thereon was evaluated. The result was "CF".

What is claimed is:

1. A method for adhering a curable composition comprising (1) an organic elastomeric polymer having at least one silicon-containing group to the silicon atom of which a hydroxyl group and/or a hydrolyzable group are bonded and which is cross linkable through formation of a siloxane linkage in a molecule, (2) an epoxy resin, (3) a curing agent for said epoxy resin and (4) a curing catalyst for said organic elastomeric polymer, which method comprises applying a primer comprising a vinyl type polymer having at least one silicon-containing group to the silicon atom of which a hydroxyl group and/or a hydrolyzable group are bonded and which is cross linkable through formation of a siloxane linkage on a substrate, applying said curable composition on the primer and curing said composition.

2. The method according to claim 1, wherein the silicon-containing group to the silicon atom of which a hydroxyl group and/or a hydrolyzable group are bonded and which is cross linkable through formation of a siloxane linkage is a group of the formula:

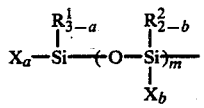
(I)

wherein X is a hydroxyl group or a hydrolyzable group, $R^1$ and $R^2$ are the same or different and each a monovalent hydrocarbon group having 1 to 20 carbon atoms or a triorganosiloxy group of the formula: $R_3^2$—Si—O— in which $R^3$ is a monovalent hydrocarbon group having 1 to 20 carbon atoms, "a" is 0, 1, 2 or 3, "b" is 0, 1 or 2 provided that the total of "a" and "b" is at least 1, and "m" is 0 or an integer of 1 to 18, that when two or more $R^1$ or $R^2$ groups are present, they may be the same or different, when two or more X groups are present, they may be the same or different, and the groups in the brackets are not necessarily the same with one another, when "m" is not zero.

3. The method according to claim 1, wherein the hydrolyzable group is at least one selected from the group consisting of a hydrogen atom, a halogen atom, an alkoxy group, an acyloxy group, a ketoximate group, an amino group, an amide group, an aminoxy group, a mercapto group and an alkenyloxy group.

4. The method according to claim 3, wherein the hydrolyzable group is at least one selected from the group consisting of a hydrogen atom, an alkoxy group, an acyloxy group, a ketoximate group, an amino group, an amide group, an aminoxy group, a mercapto group and an alkenyloxy.

5. The method according to claim 1, wherein the hydrolyzable group is an alkoxy group.

6. The method according to claim 1, wherein the silicon-containing group to the silicon atom of which a hydroxyl group and/or a hydrolyzable group are bonded and which is cross linkable through formation of a siloxane linkage is a group of the formula:

(II)

wherein $R^1$, X and "a" are the same as defined above.

7. The method according to claim 1, wherein the silicon-containing group to the silicon atom of which a hydroxyl group and/or a hydrolyzable group are bonded and which is cross linkable through formation of a siloxane linkage is bonded to an end of the molecule of the organic elastomeric polymer.

8. The method according to claim 1, wherein the organic elastomeric polymer comprises a backbone selected from the group consisting of polyethers comprising repeating units of the formula:

—R—O— wherein R is an alkylene group having 2 to 4 carbon atoms, graft polymers prepared by polymerizing a vinyl monomer in the presence of polyether, polyalkyl acrylate and copolymers of at least 50% by weight of alkyl acrylate with at least one of vinyl acetate, acrylonitrile, styrene and ethylene.

9. The method according to claim 8, wherein the backbone comprises a polyether comprising repeating units of the formula:

—R—O— wherein R is the same as defined above.

10. The method according to claim 1, wherein the organic elastomeric polymer has a number average molecular weight of 500 to 50,000.

11. The method according to claim 1, wherein the polymer is a polymer comprising repeating units derived from at least one monomer selected from the group consisting of acrylates and methacrylates.

12. The method according to claim 1, wherein the vinyl type polymer comprises monomeric units having a shortchain alkyl group of the formula:

(V)

wherein $R^7$ is an alkyl group having 1 to 8 carbon atoms, and $R^8$ is a hydrogen atom or a methyl group and acrylic monomeric units having a long-chain alkyl group of the formula:

(VI)

wherein $R^8$ is the same as defined above, and $R^9$ is an alkyl group having at least 10 carbon atoms.

13. The method according to claim 2, wherein the total of "a" and "b" is from 1 to 5.

* * * * *